United States Patent [19]

McCullough, Jr.

[11] Patent Number: 4,801,637

[45] Date of Patent: Jan. 31, 1989

[54] NUCLEATION PROCESS FOR INDUCING CRYSTALLIZATION IN POLY(ALPHA OLEFINS)

[75] Inventor: J. Douglas McCullough, Jr., Houston, Tex.

[73] Assignee: Shell Oil Company, Houston, Tex.

[21] Appl. No.: 91,363

[22] Filed: Aug. 27, 1987

Related U.S. Application Data

[63] Continuation of Ser. No. 875,828, Jun. 18, 1986, abandoned.

[51] Int. Cl.$^4$ ................................................ C08K 5/09
[52] U.S. Cl. ..................................... 524/287; 524/396; 524/570; 524/583; 524/584; 528/485; 528/486
[58] Field of Search ............... 524/287, 300, 396, 570, 524/583, 584; 525/386; 528/485, 486, 488

[56] References Cited

U.S. PATENT DOCUMENTS

| | | | |
|---|---|---|---|
| 3,207,739 | 9/1965 | Wales | 524/396 |
| 3,268,499 | 8/1966 | Wales | 524/368 |
| 3,299,029 | 1/1967 | Binsbergen et al. | 260/93.7 |
| 3,326,880 | 6/1967 | Binsbergen | 524/394 |
| 4,048,409 | 9/1977 | Sugita et al. | 526/5 |
| 4,184,026 | 1/1980 | Carrock et al. | 523/322 |
| 4,508,872 | 4/1985 | McCullough | 525/88 |
| 4,704,421 | 11/1987 | Teskin | 524/287 |

FOREIGN PATENT DOCUMENTS 211650A 2/1987 European Pat. Off. .

OTHER PUBLICATIONS

"Character of Crystallization Nuclei in Isotactic Polypropylene", Frantisek Rybnikar, *J. of Applied Sci.*, vol. 27, 1479-86 (1982).

"Heterogeneous Nucleation in the Crystallization of Polyolefins: Part I, Chemical and Physical Nature of Nucleating Agents", F. L. Binsbergen, Polymer, 11, pp. 253-267 (1970).

*Primary Examiner*—Theodore E. Pertilla

[57] ABSTRACT

The present invention relates to a process for nucleating olefin polymers prepared with high activity $MgCl_2$-supported Ti procatalysts and aluminum alkyl cocatalysts, the process involving heat treating the olefin polymers after polymerization and before melt compounding with an alcoholic solution of an aromatic carboxylic acid.

18 Claims, No Drawings

NUCLEATION PROCESS FOR INDUCING CRYSTALLIZATION IN POLY(ALPHA OLEFINS)

This is a continuation of application Ser. No. 875,828, filed June 18, 1986, now abandoned.

FIELD OF THE INVENTION

The present invention relates to a process for nucleating polypropylene. In particular, the present invention relates to a process for nucleating polypropylene directly from the reactor, wherein the polypropylene is treated with an alcoholic solution of a carboxylic acid.

BACKGROUND OF THE INVENTION

Solid polypropylene is one of the most significant commercial plastics in use today. By use of appropriate conditions and catalysts it can be produced in a sterically regulated form known as isotactic polypropylene. It is difficult, if not impossible, to polymerize propylene to a polymer which has 100% isotactic structure. However, it is possible to produce, with commercially practical catalysts, polymers which have a high proportion of segments that are completely isotactic. A property which is associated with isotacticity of polypropylene is the capacity of a melt thereof to solidify in crystalline form.

Following conventional terminology, reference to "crystalline" or "isotactic" polymers means, unless the context indicates otherwise, solid polymers having a high degree of crystallinity or isotacticity, usually at least 50%, as determined by X-ray analysis or comparable methods. Typically polypropylene having a crystallinity of this order contains less than 10% and usually less than 5% of material which is extractable in boiling heptane or isooctane. Similarly, "crystallizable" polymers are those which have a molecular arrangement that enables them to solidify from a melt in a highly crystalline structure. The general practice in the art is to refer to "crystalline" or "crystallizable" polymer, rather than "partially crystalline" or "partially crystallizable" polymer, even though olefin polymers of 100 percent crystal structure are not known to exist. For example, a crystallinity of 70% is extremely high for isotactic polypropylene. Normally solid, crystalline polypropylene usually has a viscosity average molecular weight of at least about 40,000 and generally between 100,000 and 1,200,000. For convenience the molecular weight is usually expressed in terms of intrinsic viscosity. The intrinsic viscosity of polypropylene, measured in decalin at 150° C. is generally between 1.0 and 6 dl./g. but may be as low as 0.5 or less and as high as 10 or more.

Reference to "polymers" herein includes both homopolymers and copolymers unless the context indicates otherwise.

Crystalline polymers, in their usual form, have some outstandingly good properties and some undesirable ones. For example, desirable properties of highly crystalline polypropylene are high tensile strength and substantial hardness. One disadvantage of the usual forms of highly crystalline polypropylene is a lack of transparency or clarity, which shows up as haze in thin films and as translucency, decreasing to ultimate opacity, in articles of progressively increased thickness. Another disadvantage of the usual forms of highly crystalline polypropylene is a relatively low impact resistance. This handicaps the use of isotactic polypropylene for making vessels or containers which during use may be subject to mechanical shock.

Polypropylene, like many other crystalline polymers, crystallizes from a melt in a form in which the individual crystals are often associated in spheroidal or ellipsoidal bodies known as spherulites. Generally, clarity and some mechanical properties of articles made from polypropylene are better when the spherulites are relatively small.

Methods of "nucleating" polypropylene to improve properties are also well known. U.S. Pat. Nos. 3,207,739; 3,268,499; 3,326,880 and 4,184,026 all disclose the incorporation of various nucleating agents in polypropylene. There are also a number of articles and books describing nucleation in polypropylene. For example, Binsbergen in his article "Heterogeneous Nucleation in the Crystallization of Polyolefins: Part I, Chemical and Physical Nature of Nucleating Agents", Polymer, 11, p. 253–267 (1970), tested a large number of nucleating agents, including the in-situ preparation of nucleating from aluminum isopropoxide and p-tertiary-butylbenzoic acid. Binsbergen also showed that nucleation could be achieved through addition of organic acids directly to PP when the PP contained at least 5 ppm of Al (see p. 264 in his Part I). However, to achieve good nucleation by this route required excess acid, and the latter is generally an unwanted source of volatiles, odor, corrosion, etc. Further, Rybnikar in his article, "Character of Crystallization Nuclei in Isotactic Polypropylene", Journal of Appled Polymer Science, Vol. 27, 1479–1486 (1982) showed that metastable nuclei, representing the unmelted crystalline phase of PP, stabilized by solid heterogeneities, can survive relatively high melt temperatures for practical melt processing times within limits of practical melt processing times.

While the above references have suggested various routes to nucleating polypropylene, there still remains a number of areas where improvement is needed. For example, nucleation without pelletization is desired for those new PP products now emerging. In addition, improved dispersion of the nucleant is also desired. Further, there are problems associated with nucleating polypropylene made from the new super high activity ($MgCl_2$-supported) catalysts.

SUMMARY OF THE INVENTION

The present invention relates to a new process for nucleating polypropylene and other poly(alpha olefins). In particular, the present invention relates to a process for nucleating poly(alpha olefins) prepared by polymerizing alpha olefins with a catalyst comprising a $MgCl_2$-supported Ti component and an aluminum alkyl or aluminum alkyl halide, wherein said poly(alpha olefin) after polymerization and before melt compounding is treated with an effective amount of an alcoholic solution of an aromatic carboxylic acid such that an aluminum salt of an aromatic carboxylic acid is formed.

This invention is directed to nucleated PP melt processed compositions which exhibit high clarity as well as the benefits of nucleation in terms of improved mechanical properties (higher stiffness), better thermoformability and shorter molding cycle times. Furthermore, more uniform, void-free shrinkage is to be expected. Of great importance is the ability to sell product containing well dispersed nucleant without having to pelletize it first.

It is shown in this invention that PP as made from super high activity catalysts are uniquely suited for nucleation through reaction (or largely reaction) of said carboxylic acids with catalyst metal residues, and particularly the residual aluminum. Routes to achieving this reaction are described below.

However, it was unexpectedly found that direct combination of carboxylic acid (e.g. benzoic acid) and PP made from a super active catalyst led to mediocre nucleation on simple dry blending and melting of the components. The same conditions led to excellent nucleation with PP as made from a conventional catalyst.

This invention includes the discovery of routes to effecting excellent nucleation of polyolefins (PO) made via high activity catalysis, and especially PP, such that the nucleation effectiveness exceeds that with conventionally produced PP. These routes include treatment powder from polymerization—still containing active aluminum alkyl/alkyl chloride species—with an alcoholic, e.g. IPA (or other solvent), solution of the carboxylic acid, similar treatment of PP/PO powder exposed to air, and treatment of powder isolated from polymerization, and possibly exposed to air, with the carboxylic acid and thermally treating the material below the PP/PO melting point (for a predetermined period) before melt compounding.

It is essential for application in film, textiles, etc. that volatiles within the polymer be kept to a minimum. Binsbergen, as mentioned above, had suggested that good nucleation of metal residues within PP requires a substantial excess of the carboxylic acid. In fact, the excess acid constitutes a volatile material which can lead to unwanted extruder smoke, bubbles in thin sections, mold corrosion and so on. By the preferred routes to nucleation in this invention, free acid is kept to a minimum by virtue of maximizing direct reaction between metal and carboxylic acid. Evidence for formation of aluminum benzoate, when benzoic acid is used, is cited in Illustrative Embodiment No. 1. Further, it is shown that the absence of significant amounts of aluminum benzoate in PP containing benzoic acid correlates with the absence of the desired nucleation effect.

As stated above, one route to improved nucleation involves thermal treatment of an appropriate carboxylic acid—PP powder composition before melt compounding. It is speculated that the preheat prior to melting (the mixture) allows selective displacement on aluminum of aromatic ester-type stereochemical control agents by the carboxylic acid. It is known that aluminum alkyl containing species can complex and react with such esters (J. C. W. Chien and J. C. Wu, J. Polymer Science, Polymer Chemistry Ed., Vol. 20, 2445–2460, 1982). For whatever reason, in the absence of preheating, nucleation from the melt remains mediocre, even after a second melting and recrystallization.

In general, the effects of nucleation, i.e. higher recrystallization temperature, shorter isothermal crystallization half-time (ICHT), and higher tensile or flexural properties (measures of stiffness) are readily measurable. Tensile and flexural properties parallel one another, and are indicators of crystallinity.

High clarity PP is obtained when product made in accordance with this invention is melt processed and fabricated into articles. In marked contrast, it has been shown that physical blends of PP with a commonly used nucleant, sodium benzoate, often exhibit relatively large undispersed nucleant particles (visible readily to the eye) after one melt history. Comparison with identical samples not containing the nucleant demonstrates that the undispersed particles result from the nucleant. Such undispersed nucleant material is not only cosmetically undesirable, but it may under some circumstances of use lead to reduction of properties and part embrittlement.

DETAILED DESCRIPTION OF THE INVENTION

The poly(alpha olefins) nucleated in this present invention are homopolymers of $C_3$–$C_5$ alpha monoolefins and copolymers of such alpha monoolefins. Preferably the poly(alpha olefins) are homopolymers of propylene or butylene or copolymers of propylene or butylene with other monomers, such as ethylene.

The polypropylene employed is the so-called isotactic polypropylene as opposed to atactic polypropylene. This polypropylene is described in Kirk-Othmer Encyclopedia of Chemical Technology, Volume 14, pages 217–335 (1967) and in U.S. Pat. No. 3,112,300. The weight average molecular weight of the polypropylene employed is typically in excess of about 100,000. The polypropylene suitable for this invention may be prepared using methods well known in the art. Depending on the specific catalyst and polymerization conditions employed, the polymer produced may contain atactic as well as isotactic, syndiotactic or so-called stereo-block molecules. If desired, the polypropylene employed may be a copolymer containing minor (1 to 20 percent by weight) amounts of ethylene or other olefin comonomers. Also included are impact polypropylenes, which structures are well known in the art.

The polybutylene also has an isotactic structure. The manufacturing process is normally carried out in an inert diluent such as hexane. The molecular weight of the polybutylene is typically in excess of about 30,000.

An important aspect of the present invention is that the poly(alpha olefin) is prepared with a high activity catalyst system, i.e. a $MgCl_2$-supported Ti-type catalyst system.

The high activity olefin polymerization catalysts used in the present invention are prepared by combining a solid component comprising at least magnesium, titanium and chlorine with an activating organoaluminum compound. These may be referred to as supported coordination catalysts or catalyst systems. The activity and stereospecific performance of such compositions is generally improved by incorporating an electron donor (Lewis base) in the solid component and by employing as a third catalyst component an electron donor which may be complexed in whole or in part with the activating organoaluminum compound.

For convenience of reference, the solid titanium-containing constituent of such catalysts is referred to herein as "procatalyst", the organoaluminum compound, whether used separately or partially or totally complexed with an electron donor, as "cocatalyst", and the electron donor compound, whether used separately or partially or totally complexed with the organoaluminum compound, as "selectivity control agent" (SCA).

The support material may also be partially comprised of an inert component, e.g. silica, which by virtue of its geometry, determines the particulate nature of product exiting the polymerization reactor(s), i.e. spherical silica could be so used.

The procatalysts which are employed in the catalyst system in this invention may be produced by methods known in the art. These procatalysts are any one of the recently developed, high activity magnesium halide supported catalyst components disclosed e.g., in U.S.

Pat. Nos. 3,953,414, 4,051,313, 4,115,319, 4,149,990, 4,211,339, 4,220,554, 4,226,741, 4,263,169, 4,329,253, 4,400,302 and 4,414,132, hereby incorporated in this application by reference.

In general these procatalysts are referred to as "magnesium chloride and titanium-containing caralysts'—i.e., $MgCl_2$-$TiCl_4$ catalysts. These procatalysts typically also contain an "inside" electron donor. Suitable electron donors which are used in the preparation of the solid catalyst component are ethers, esters, ketones, phenols, amines, amides, imines, nitriles, phosphines, phosphites, stilbines, arsines, phosphoramides and alcoholates. Examples of suitable donors are those referred to in U.S. Pat. No. 4,136,243 or its equivalent British Specification No. 1,486,194 and in British Specification No. 1,554,340 or its equivalent German Offenlegungsschrift No. 2,729,126. Preferred donors are esters and diamines, particularly esters of aromatic carboxylic acids, such as ethyl and methyl benzoate, p-methoxy ethyl benzoate, p-ethoxy ethyl benzoate, p-ethoxy methyl benzoate, ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amino hexyl benzoate, isopropyl naphthenate, n-amyl toluate, ethyl cyclohexanoate, propyl pivalate, N,N,N',N'-tetramethylethylenediamine, 1,2,4-trimethylpiperazine, 2,3,4,5-tetraethyl piperidiene and similar compounds. Preferred electron donors for use in preparing the titanium constituent are ethyl benzoate or diisobutyl phthalate.

The organoaluminum compound to be employed as cocatalyst may be chosen from any of the known activators in olefin polymerization catalyst systems comprising a titanium halide but is most suitably free of halogens. While trialkylaluminum compound, dialkylaluminum halides and dialkylaluminum alkoxides may be used, trialkylaluminum compounds are preferred, particularly those wherein each of the alkyl groups has 2 to 6 carbon atoms, e.g., triethylaluminum, tri-n-propylaluminum, triisobutylaluminum, triisopropylaluminum and dibutyl-n-amylaluminum.

Preferred proportions of selectivity control agent, employed separately, in combination with, or reacted with an organoaluminum compound, calculated as mole per mole aluminum compound, are in the range from 0.1 to 1.5, particularly from 0.2 to 0.5.

Proportions of electron donor contained in the solid catalyst component, calculated as mole per mole of magnesium, are suitably in the range from 0.01 to 10, e.g., from 0.01 to 10 and from 0.05 to 5.0 and especially from 0.05 to 0.5.

The electron donor used as SCA may be the same, but is preferably different from the "inside" electron donor. Preferred SCAs are p-ethyl anisate and p-ethyl ethoxy benzoate and certain silane compounds.

To prepare the final polymerization catalyst composition, procatalyst, cocatalyst and selectivity control agent, are fed to the reactor, most suitably employing a molar ratio to produce in the final catalyst an atomic ratio of aluminum to titanium of from 1:1 to 150:1, and suitably from about 10:1 to about 150:1. The catalysts of this invention tend to exhibit very good activity at much lower Al:Ti ratios, e.g., below 80:1 and even below 50:1, than prior art catalysts of the same type. It may, however, be advantageous under some conditions to employ them at higher Al-Ti ratios. Increasing the Al:Ti ratio tends to increase catalyst activity at the expense of increased catalyst residue in the unextracted product. These factors, as well as the desired level of isotacticity, will be considered in selecting the Al:Ti ratio for any given process and desired product. In general, Al:Ti ratios in the range of 30:1 to 100:1 and especially of about 50:1 to 80:1 will be found advantageous.

After polymerization and before melt compounding, the poly(alpha olefin) particulate is recovered and treated with an alcoholic solution of an aromatic carboxylic acid. The alcohol employed herein is a $C_1$ to $C_5$ aliphatic alcohol. Preferred alcohols include methanol, ethanol, n-butanol, i-butanol and isopropynol. A much preferred alcohol is isopropynol (isopropyl alcohol).

The aromatic carboxylic acids used herein are preferably aromatic monocarboxylic acids. A preferred group includes benzoic acid, o-toluic acid, m-toluic acid, p-toluic acid, p-anisic acid, and p-ethoxy benzoic acid. A much preferred acid is benzoic acid.

The alcoholic solution contains these preferred concentrations:

|  | Percent Weight Acid |
| --- | --- |
| Preferred | 0.1 to 50 |
| More Preferred | 0.5 to 25 |

It is also preferred that the alcoholic solution contains no water.

The alcoholic solution is contacted with the powder, flake, spherical granules or otherwise particulate poly(alpha olefin) by intimate mixing prior to any melt compounding. The temperature of heat treatment must be below the melting point of the poly(alpha olefin). For propylene homopolymer the preferred heat treatment is 30° to 90° C. for 5 to 30 minutes. By a preferred route to improved nucleation, advantage is made of the sublimation tendencies of various aromatic carboxylic acids, and in particular, benzoic acid. On contacting said acid with poly(alpha olefin) particulate material and heating above the sublimation temperature during such contact excellent nucleation character is induced. In general, the temperature should be selected so as to cause the acid to sublime freely, which for benzoic acid is at or near 100° C. The temperature of contacting acid and polymer should not reach the peak or main (highest) melting point of the polymer, as it has been found that a melting of such compositions without preconditioning at a temperature below melting leads to mediocre nucleation.

The preferred duration of contacting acid and poly(alpha olefin) polymer is between 10 and 60 minutes. More preferred would be 15 to 30 minutes.

It should be noted that heat treatment or pre-conditioning as is discussed above is of no benefit for PP prepared from conventional catalysis with a $Ti$-$Cl_3$-based system. Thus it (pre-conditioning) is uniquely suited for $MgCl_2$—$TiCl_4$ catalysts.

An "effective" amount of carboxylic acid is used. In typical practice this means that greater than 100 ppmw (based on the poly(alpha olefin)) is used. Further, the amount of acid used should be less than or equal to the stoichiometric amount needed to react with the aluminum cocatalyst or aluminum residue thereof in the poly(alpha olefin). Typically, the amount of acid added is less than 2000 ppmw (parts per million by weight).

After heat treatment the treated poly(alpha olefin) may be recovered or it may be pelletized and then recovered. The advantages of the present invention will become apparent after the melt treatment or melt compounding of the treated polymers.

The invention is further illustrated by reference to the following examples.

ILLUSTRATIVE EMBODIMENT 1

PP homopolymers were polymerized in a one-gallon autoclave using a TiCl$_4$/magnesium chloride supported catalyst system. A ribbon type agitator was installed for the purpose of mixing polymer powder after solvent removal.

Under typical conditions, the following quantities of materials were charged to the reactor:

| | |
|---|---|
| propylene: | 2700 ml |
| hydrogen: | 132 mmoles |
| supported catalyst: | 0.01 mmole Ti |
| Triethyl aluminum (TEA): | 0.7 mmole |
| para-ethylanisate (pEA): | 0.35 mmole |
| diethyl aluminum chloride (DEAC): | 0.15 mmole |
| Reaction conditions were: | |
| Diluent: | isooctane |
| Temperature: | ~65° C. |
| Reaction Time: | 1 hr. |
| Agitation: | 300 rpm |

The order of addition of ingredients was: (1) propylene, (2) hydrogen, (3) pEA, (4) TEA, (5) the combination of DEAC added to TiCl$_4$/magnesium chloride supported catalyst.

After the 60 min reaction time, propylene was vented and the polymer was brought to 70° C. under constant agitation. Then a partial vacuum was pulled to remove residual isooctane.

In the control run (PP-6), the powder was dried in a vacuum oven at 50° C. for 4 hrs. The yield was 210 g (yield on catalyst=12.97 kg polymer/g cat-hr).

For benzoic acid treatment, the reactor contents (after isooctane removal) were pressured to 50 psi and a solution of 2.1 mmole of benzoic acid in 20 ml of isopropyl alcohol (IPA) was injected into the reactor through the catalyst pump. The reactor contents were then mixed at 70° C. for 15 min. Then IPA was removed under partial vacuum, and the polymer (PP-7) was isolated and dried in a vacuum oven at 50° C. for 4 hr. The yield was 288 g (yield on catalyst=17.8 kg polymer/g cat-hr).

A portion (20 g) of the control sample (PP-6), after air exposure for more than a week, was heated in an oven to 70° C. in a glass jar. It was then contacted with three equivalents of benzoic acid (0.0244 g–0.200 mmole) dissolved in 1.9 ml of IPA. After thorough mixing, the contents were heated in the oven for 15 more min at 70° C. before collecting as product PP-8.

The latter experiment was repeated with commercially made PP homopolymer powder as made with a conventional TiCl$_3$ (also including TEA and DEAC) catalyst (PP-9). After treatment with the same amount of benzoic acid in IPA, product PP-10 was isolated.

Residual aluminum, titanium and chloride levels of PP's 6–10 were obtained via neutron activation, and are recorded in Table 1 along with equivalent amounts (ppmw) of aluminum benzoate and actual levels of benzoic acid added. The aluminum to chloride ratio (Al:Cl) is also shown.

TABLE 1

| Product | Al ppmw | Ti ppmw | Cl ppmw | Actual Benz. Acid, ppmw | Alum. Benz. (Theory), ppmw | Al:Cl |
|---|---|---|---|---|---|---|
| PP-6 | 104 | 3.6 | 85 | — | — | 1.22 |
| PP-7 | 78 | 2.0 | 35 | 890 | 947 | 2.23 |
| PP-8 | 115 | 5.3 | 78 | 1220 | 1300 | 1.47 |
| PP-9 | 17 | 17 | 15 | — | — | 1.13 |
| PP-10 | 16 | 14 | 13 | 1220 | 231.5 | 1.23 |

A comparison of infrared analyses of products PP-8 and PP-10 showed the product made from a TiCl$_4$/magnesium chloride supported catalyst (PP-8) exhibited absorptions characteristic of aluminum benzoate (bands at 1603, 1563, and 720 cm$^{-1}$) plus some residual benzoic acid with absorption at 1695 and 710 cm$^{-1}$. The spectrum for conventionally made polymer (PP-10) contained absorption characteristic of benzoic acid and very little evidence for any aluminum benzoate.

Examination of Al to Cl ratio (Al:Cl) data suggests that the highest displacement of chloride (as from DEAC) by added benzoic acid occurred with direct reaction of a solution of the carboxylic acid with active aluminum co-catalyst species. Thus PP-7 should incorporate the highest conversion of benzoic acid to aluminum benzoate.

The ratio data also imply the lowest conversion occurred with the conventional catalyst product, PP-10. It also has a relatively low aluminum content.

Differential thermal analyses performed on PP's 6–10 support the above analytical results. Table 2 includes data for two cycles of melting and cooling for each product, as measured on the Perkin Elmer DSC-2. With each melting-cooling cycle, the test sample (ca 5 mg) was held 5 min at the peak temperature (220° C.) before cooling. Both heating and cooling rates were 10° C./min. The samples were heated in covered, but unsealed pans, so as to simulate exposure to oxidative conditions experienced during typical melt processing.

TABLE 2

| | First Cycle | | Second Cycle | |
|---|---|---|---|---|
| Product | Melting Pt., °C. | Recryst. T, °C. | Melting Pt., °C. | Recryst. T, °C. |
| PP-6 | 163 | 113 | 160 | 113 |
| PP-7 | 161 | 128 | 165 | 129 |
| PP-7 | 163 | 127 | 164 | 127 |
| PP-7 | 163 | 128 | 165 | 128 |
| PP-8 | 164 | 125 | 164 | 125 |
| PP-8 | 163 | 127 | 164 | 126 |
| PP-8 | 164 | 128 | 165 | 128 |
| PP-9 | 163 | 113 | 160 | 113 |
| PP-10 | 163 | 112 | 160 | 112 |

The results show that the best nucleation (highest recrystallization temperatures, especially from the second melting cycle) occurred with PP-7, as would be expected from its mode of preparation and the Al to Cl ratio (Table 1). Further, good nucleation was achieved with PP-8, but none at all with the conventionally prepared PP-10 (compare to its PP-9 precursor). The latter findings agree with the aforementioned infrared results which show very little evidence for aluminum benzoate in PP-10.

ILLUSTRATIVE EMBODIMENT 2

In this example, PP powder samples were heated with a slight excess over stoichiometrically equivalent amounts of benzoic acid based on aluminum levels in each powder. Sample heating was carried out in a controlled temperature oven with each composition placed within a test tube corked with an aluminum foil liner. A portion of each sample was withdrawn after heating for 20 min at 110° C. (benzoic acid sublimes at 100° C. and melts at 122° to 123° C.). The remainder of each sample was heated for an additional 30 min at 129° C. Unheated portions of each composition were retained as controls.

The materials for testing included PP-6, PP-11 (commercially prepared powder from a propylene-ethylene sequential polymerization on a TiCl4/magnesium chloride supported catalyst-ethylene content ~8%w; EPR fraction ~14%w), and PP-12 (a commercially prepared PP homopolymer made with a conventional TiCl3 catalyst).

Respective aluminum, benzoic acid and aluminum benzoate (theory) levels are given in Table 3.

TABLE 3

| Sample | Al, ppmw | Benzoic Acid, ppmw | Alum. Benzoate (Theory), ppmw |
|---|---|---|---|
| PP-6 | 104 | 1500 | 1500 |
| PP-11 | 110 | 1500 | 1590 |
| PP-12 | 29 | 500 | 420 |

As in Illustrative Embodiment No. 1, two cycles of differential thermal analytical results were obtained, and are displayed in Table 4.

TABLE 4

| | | | First Cycle | | Second Cycle | |
|---|---|---|---|---|---|---|
| No. | Sample | Preconditioning With Benz. Acid | Melt Pt. °C. | Re-cryst. T, °C. | Melt Pt. °C. | Re-cryst. T, °C. |
| 1 | PP-6 | not heated | 164 | 121 | 164 | 121 |
| 2 | PP-6 | 110° C. for 20 min | 164 | 127 | 165 | 127 |
| 3 | PP-6 | +129° C. for 30 min | 164 | 129 | 165 | 129 |
| 4 | PP-6 | not heated/no acid | 163 | 113 | 160 | 113 |
| 5 | PP-11 | not heated | 164 | 119 | 164 | 118 |
| 6 | PP-11 | 110° C. for 20 min | 165 | 125 | 165 | 124 |
| 7 | PP-11 | +129° C. for 30 min | 164 | 125 | 165 | 125 |
| 8 | PP-11 | not heated/no acid | 165 | 115 | 162 | 115 |
| 9 | PP-12 | not heated | 161 | 126 | 162 | 125 |
| 10 | PP-12 | 110° C. for 20 min | 162 | 126 | 163 | 125 |
| 11 | PP-12 | +129° C. for 30 min | 162 | 126 | 163 | 126 |
| 12 | PP-12 | not heated/no acid | 162 | 108 | 158 | 108 |

It is seen from the above that products of super high activity catalysis (PP-6 and PP-11) do not exhibit optimal recrystallization temperatures when not preheated. In fact, it appears the preheat must be conducted with PP in the solid state, since one complete thermal cycle with melting doesn't substitute for preheating, i.e. recrystallization temperatures remain mediocre for both cycles (viz. Nos. 1 and 5). Even a moderate preheat at 110° C. (allows sublimation of benzoic acid) significantly improves recrystallization temperatures for PP-6 and PP-11 combinations with benzoic acid (Nos. 2 and 6). It can be presumed that the low levels of nucleation seen with the analogous unheated combinations are also consistent with higher levels of unreacted and volatile benzoic acid in the product. Such free acid, as has already been mentioned, can be the source of a variety of fabrication problems.

In contrast to the products of super high activity catalysis, those from conventional catalysis with adequate aluminum contents (e.g. PP-12) do not require preconditioning for the incidence of optimal nucleation. Compare Nos. 9 and 10, and further compare to the unnucleated control, No. 12. It is speculated that the difference is related to complexation of the aluminum species by ester-type stereochemical control agents used with super high activity catalysts; however, other as yet unidentified factors may be the source of the difference. In any event, the preconditioning step is critical for products of super high activity catalysts based on TiCl4 supported on magnesium chloride.

ILLUSTRATIVE EMBODIMENT 3

This example provides a comparison between nucleation via addition of the conventional nucleant, sodium benzoate, and nucleation by means of addition of an alcoholic solution of benzoic acid to polymer containing active catalyst residues (aluminum alkyl and alkyl chlorides are still present, and some alkylation may be polymer derived). More specifically, PP-6 was melt compounded in a Brabender mixing head with 1310 ppmw of sodium benzoate (mixing conditions: 230° C.; 60 rpm for 2 min; air atmosphere). PP-7 (already nucleated by the alternative route mentioned above) was similarly melt compounded in two portions (one "as is" and the other with 0.1%w BHT stabilizer).

The melt processed materials were further compression molded into this (45 mil) plaques. The plaques were examined for clarity; tensile bars were die cut from them for tensile tests, and small sections were submitted for DSC analyses. Results of testing are displayed in Table 5.

TABLE 5

| | Tensile Properties | | Cycle 1 | | Cycle 2 | |
|---|---|---|---|---|---|---|
| Product | Brk. Str. psi | Brk. El. % | Melt Pt. °C. | Recryst. T, °C. | Melt Pt. °C. | Recryst. T, °C. |
| PP-7 | 4320 | 8.9 | 167 | 125 | 166 | 125 |
| PP-7/BHT | 4610 | 4.4 | 167 | 124 | 164 | 123 |
| PP-6/NaBz | 3940 | 2.9 | 164 | 124 | 163 | 122 |

Nucleant dispersion was best for PP-7 as evidenced by the higher tensile properties. Plaques made from PP-7, or PP-7 with BHT, exhibited no indication of nonuniform dispersion of nucleant, whereas some visual indications thereof were seen with plaques made from PP-6 plus sodium benzoate.

Although the nucleant level was significantly higher with PP-6 plus sodium benzoate (1310 versus 890), PP-7 (without BHT) exhibited the highest recrystallization temperature in both thermal cycles. The addition of BHT to PP-7 appeared to have a slight detrimental effect on the recrystallization temperature.

ILLUSTRATIVE EMBODIMENT 4

In the above example, the compositions were melt compounded in a mixing device before moldings were made and thermal measurements taken (on the moldings). On consideration of direct melt fabrication of articles from reactor product which had not seen the benefit of melt compounding to pellets, comparisons should be made between mixtures of sodium benzoate with PP powder and the directly nucleated PP-7. Such a comparison is made in Table 6.

TABLE 6

| | First Cycle | | Second Cycle | |
|---|---|---|---|---|
| Product | Melting Pt., °C. | Recryst. T, °C. | Melting Pt., °C. | Recryst. T, °C. |
| PP-6 | 163 | 113 | 160 | 113 |

TABLE 6-continued

| | First Cycle | | Second Cycle | |
|---|---|---|---|---|
| Product | Melting Pt., °C. | Recryst. T, °C. | Melting Pt., °C. | Recryst. T, °C. |
| PP-6 + 1310 ppmw NaBz | 164 | 119 | 164 | 119 |
| PP-7 | 163 | 128 | 165 | 128 |

It should be clearly evident that the use of sodium benzoate requires an intensive melt mix (see Illustrative Embodiment No. 3) before part fabrication, in order to get good nucleation performance as well as good clarity (free of undispersed nucleant) in the final article.

What is claimed is:

1. A process for nucleating crystalline propylene homopolymer or copolymer prepared by polymerizing propylene or propylene and a comonomer with a catalyst comprising a $MgCl_2$-supported Ti procatalyst component and a cocatalyst component selected from the group consisting of aluminum alkyls, aluminum alkyl halides and mixtures thereof, wherein said homopolymer, or copolymer after polymerization but still containing active aluminum and before melt compounding, is treated at an elevated temperature below the melt temperature of said homopolymer or copolymer with an effective amount of an alcoholic solution of an aromatic carboxylic acid such that an aluminum salt of an aromatic carboxylic acid is formed.

2. The process of claim 1 wherein said homopolymer or copolymer is a propylene homopolymer.

3. The process of claim 1 wherein said cocatalyst component is an aluminum alkyl.

4. The process of claim 3 wherein said aluminum alkyl is triethyl aluminum.

5. The process of claim 1 wherein the alcohol used is an aliphatic monohydric alcohol containing less than five carbon atoms.

6. The process of claim 5 wherein said alcohol is isopropyl alcohol.

7. The process of claim 1 wherein said aromatic carboxylic acid is benzoic acid.

8. The process of claim 2 wherein said polypropylene after polymerization and before melt compounding is treated at a temperature from about 30 to about 90° C. for 5 to 30 minutes in the presence of an isopropyl alcohol solution of benzoic acid.

9. A process for nucleating crystalline propylene homopolymer or copolymer prepared by polymerizing propylene or propylene and a comonomer with a catalyst comprising a $MgCl_2$-supported Ti procatalyst component and a cocatalyst component selected from the group consisting of aluminum alkyls, aluminum alkyl halides and mixtures thereof, wherein said homopolymer or copolymer after polymerization, but still containing active aluminum and before melt compounding, is thermally contacted with an effective amount of an aromatic carboxylic acid at a temperature whereupon the carboxylic acid freely sublimes or melts, but the polymer does not achieve a fully molten state.

10. The process of claim 9 wherein said homopolymer or copolymer is a propylene homopolymer.

11. The process of claim 9 wherein said cocatalyst component is an aluminum alkyl.

12. The process of claim 11 wherein said aluminum alkyl is triethyl aluminum.

13. The process of claim 9 wherein said aromatic carboxylic acid is benzoic acid.

14. The process of claim 1 wherein the amount of aromatic carboxylic acid used is greater than 100 ppmw based on said homopolymer or copolymer and equal to or less than the stoichiometric amount needed to interact with all the aluminum cocatalyst or aluminum residue thereof in said homopolymer or copolymer.

15. The process of claim 9 wherein the amount of aromatic carboxylic acid used is greater than 100 ppmw based on said homopolymer or copolymer and equal to or less than the stoichiometric amount needed to interact with all the aluminum cocatalyst or aluminum residue thereof in said homopolymer or copolymer.

16. The process of claim 14 wherein the amount of aromatic carboxylic acid used is less than 2000 ppmw.

17. The process of claim 15 wherein the amount of aromatic carboxylic acid used is less than 2000 ppmw.

18. The process of claim 1 wherein said alcoholic solution comprises about 0.1 to about 50 percent weight aromatic carboxylic acid.

* * * * *